US008117357B2

(12) United States Patent
Pechanek et al.

(10) Patent No.: US 8,117,357 B2
(45) Date of Patent: Feb. 14, 2012

(54) SYSTEM CORE FOR TRANSFERRING DATA BETWEEN AN EXTERNAL DEVICE AND MEMORY

(75) Inventors: Gerald George Pechanek, Cary, NC (US); David Carl Strube, Raleigh, NC (US); Edwin Frank Barry, Vilas, NC (US); Charles W. Kurak, Jr., Durham, NC (US); Carl Donald Busboom, Cary, NC (US); Dale Edward Schneider, Durham, NC (US); Nikos P. Pitsianis, Durham, NC (US); Grayson Morris, Eindhoven (NL); Edward A. Wolff, Stockton, CA (US); Patrick R. Marchand, Apex, NC (US); Ricardo E. Rodriguez, Raleigh, NC (US); Marco C. Jacobs, Durham, NC (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 13/106,042

(22) Filed: May 12, 2011

(65) Prior Publication Data
US 2011/0219210 A1 Sep. 8, 2011

Related U.S. Application Data

(63) Continuation of application No. 11/827,548, filed on Jul. 12, 2007, now Pat. No. 7,962,667, which is a continuation of application No. 10/797,726, filed on Mar. 10, 2004, now Pat. No. 7,266,620, which is a continuation of application No. 09/599,980, filed on Jun. 22, 2000, now Pat. No. 6,748,517.

(60) Provisional application No. 60/140,425, filed on Jun. 22, 1999.

(51) Int. Cl.
*G06F 13/28* (2006.01)
*G06F 13/00* (2006.01)

(52) U.S. Cl. .............................. 710/33; 710/308; 712/24
(58) Field of Classification Search .............. 710/22–35, 710/308; 712/22–24
See application file for complete search history.

(56) References Cited

U.S. PATENT DOCUMENTS

| 6,446,191 B1* | 9/2002 | Pechanek et al. ................ 712/24 |
| 6,748,517 B1* | 6/2004 | Pechanek et al. ............. 710/200 |
| 7,181,730 B2* | 2/2007 | Pitsianis et al. ............... 717/132 |
| 7,266,620 B1* | 9/2007 | Pechanek et al. ................ 710/22 |
| 7,577,824 B2* | 8/2009 | Pechanek et al. ............. 712/205 |
| RE41,703 E * | 9/2010 | Pechanek et al. ................ 712/24 |
| 2002/0019910 A1* | 2/2002 | Pitsianis et al. ............... 711/125 |
| 2009/0063724 A1* | 3/2009 | Pechanek et al. ................ 710/22 |
| 2011/0219210 A1* | 9/2011 | Pechanek et al. ................ 712/24 |

* cited by examiner

*Primary Examiner* — Christopher B Shin
(74) *Attorney, Agent, or Firm* — Law Offices of Peter H. Priest, PLLC

(57) ABSTRACT

Details of a highly cost effective and efficient implementation of a manifold array (ManArray) architecture and instruction syntax for use therewith are described herein. Various aspects of this approach include the regularity of the syntax, the relative ease with which the instruction set can be represented in database form, the ready ability with which tools can be created, the ready generation of self-checking codes and parameterized test cases. Parameterizations can be fairly easily mapped and system maintenance is significantly simplified.

20 Claims, 3 Drawing Sheets

FIG. 2

```
                                            ┌─ 200 foreach instruction (add mpy sub) (
      # for each processor
      foreach p (s p) (
        # for each conditional execution
        foreach ce (e t. f.) (
          # for each unit that the instruction holds
          foreach unit (a m d) (
            # foreach testvector
            foreach columns in answerset (
              # generate test with these parameters
            )
          )
        )
      )
    )
```

FIG. 3

```
                                            ┌─ 300 set instruction(MPY,FORMAT,1sw)      (RTE RX RY)
    set instruction(MPY,FORMAT,1uw)      (RTE RX RY)
    set instruction(MPY,FORMAT,2sh)      (RTE RX RY)
    set instruction(MPY,FORMAT,2uh)      (RTE RX RY)
    set instruction(MPY,RFACCESS)        ((WRITE) (READ) (READ))
    set instruction(MPY,DATATYPES)       (1sw 1uw 2sh 2uh)
    set instruction(MPY,DIFFDATATYPES)   ((1sw 1sd 1sw 1sw)(1uw 1ud 1uw 1uw)\
                                          (2sh 2sw 2sh 2sh)(2uh 2uw 2uh 2uh))
    set instruction(MPY,PROCS)           (s p)
    set instruction(MPY,UNITS)           (m)
    set instruction(MPY,CE)              (e t.f.c n v z)
    set instruction(MPY,CC)              (e)
    set instruction(MPY,CCOMBO)          (e)
    set instruction(MPY,SUFFIX)          (e)
    set instruction(MPY,CYCLES)          2
```

```
#setting up state
set instruction(MPY,AS,RXb)    ((maxint)                  (minint)                    )
set instruction(MPY,AS,RYb)    ((maxint)                  (minint)                    )
set instruction(MPY,AS,Cb)     ((0)                       (0)                         )
set instruction(MPY,AS,Vb)     ((0)                       (0)                         )
set instruction(MPY,AS,Nb)     ((0)                       (0)                         )
set instruction(MPY,AS,Zb)     ((0)                       (0)                         )

#specifying desired state.
set instruction(MPY,AS,RTa)    ((mpexpr(maxint)*(maxint)) (mpexpr(minint)*(minint))   )
set instruction(MPY,AS,Ca)     ((0)                       (0)                         )
set instruction(MPY,AS,Va)     ((0)                       (0)                         )
set instruction(MPY,AS,Na)     ((sign0unsil)              (0)                         )
set instruction(MPY,AS,Za)     ((0)                       (sign0unsil)                )
```

SYSTEM CORE FOR TRANSFERRING DATA BETWEEN AN EXTERNAL DEVICE AND MEMORY

RELATED APPLICATIONS

The present application is a continuation of and claims the benefit of and priority to U.S. Ser. No. 11/827,548 filed Jul. 12, 2007 which is a continuation of U.S. Ser. No. 10/797,726 filed Mar. 10, 2004 issued as U.S. Pat. No. 7,266,620 which is a continuation of U.S. Ser. No. 09/599,980 filed Jun. 22, 2000 issued as U.S. Pat. No. 6,748,517 which claims the benefit of U.S. Provisional Application Ser. No. 60/140,425 filed Jun. 22, 1999 all of which are incorporated herein by reference in their entirety.

FIELD OF THE INVENTION

The present invention relates generally to improvements to parallel processing, and more particularly to such processing in the framework of a ManArray architecture and instruction syntax.

BACKGROUND OF THE INVENTION

A wide variety of sequential and parallel processing architectures and instruction sets are presently existing. An ongoing need for faster and more efficient processing arrangements has been a driving force for design change in such prior art systems. One response to these needs have been the first implementations of the ManArray architecture. Even this revolutionary architecture faces ongoing demands for constant improvement.

SUMMARY OF THE INVENTION

To this end, the present invention addresses a host of improved aspects of this architecture and a presently preferred instruction set for a variety of implementations of this architecture as described in greater detail below. Among the advantages of the improved ManArray architecture and instruction set described herein are that the instruction syntax is regular. Because of this regularity, it is relatively easy to construct a database for the instruction set. With the regular syntax and with the instruction set represented in database form, developers can readily create tools, such as assemblers, disassemblers, simulators or test case generators using the instruction database. Another aspect of the present invention is that the syntax allows for the generation of self-checking codes from parameterized test vectors. As addressed further below, parameterized test case generation greatly simplifies maintenance. It is also advantageous that parameterization can be fairly easily mapped.

These and other features, aspects and advantages of the invention will be apparent to those skilled in the art from the following detailed description taken together with the accompanying drawings.

BRIEF DESCRIPTION OF THE DRAWINGS

FIG. 2 illustrates an exemplary test case generator program in accordance with the present invention;

FIG. 3 illustrates an entry from an instruction-description data structure for a multiply instruction (MPY); and FIG. 4 illustrates an entry from an MAU-answer set for the MPY instruction.

DETAILED DESCRIPTION

Figure 1:
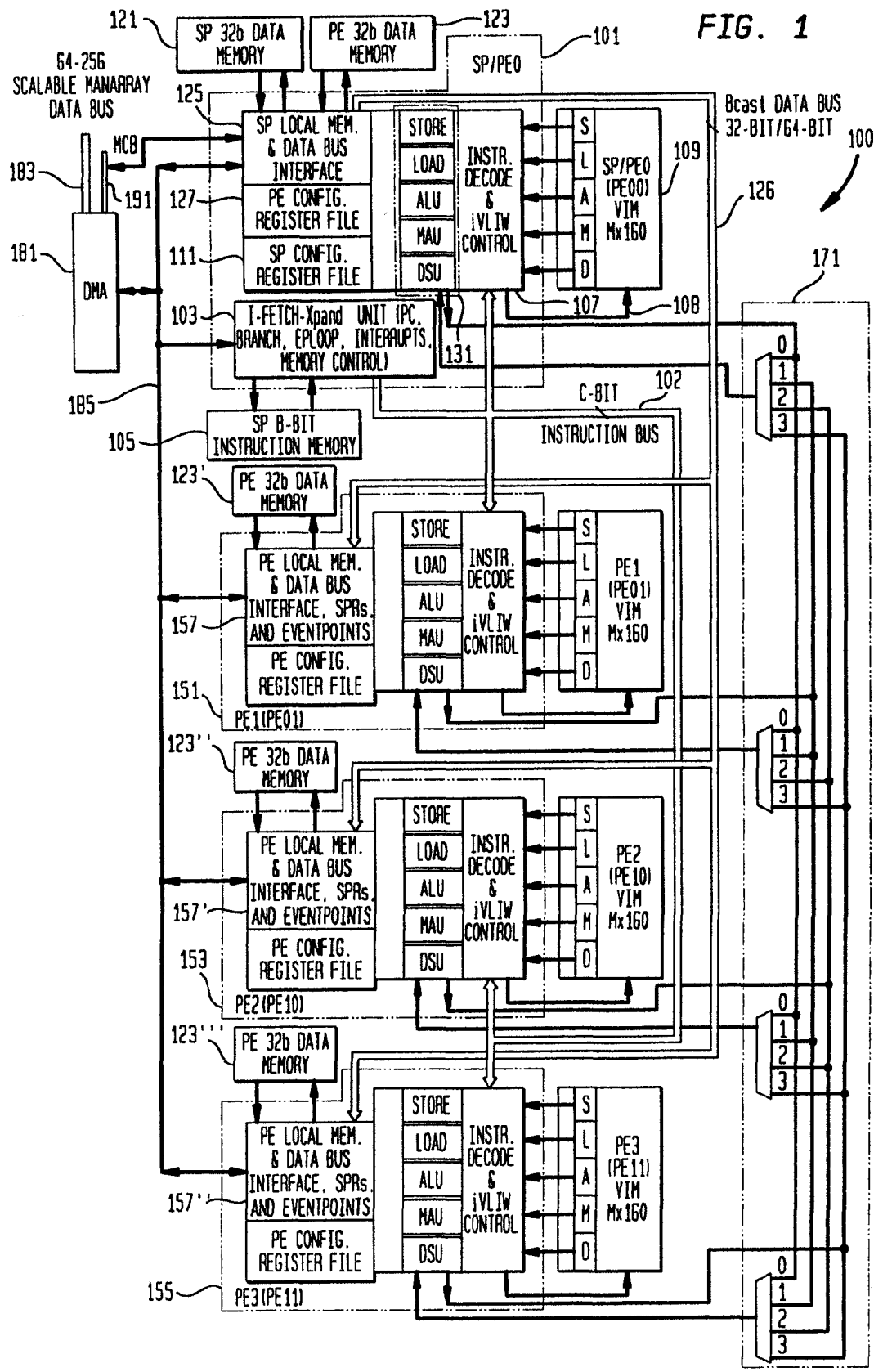
FIG. 1 illustrates an exemplary ManArray 2×2 iVLIW processor showing the connections of a plurality of processing elements connected in an array topology for implementing the architecture and instruction syntax of the present invention.

Further details of a presently preferred ManArray core, architecture, and instructions for use in conjunction with the present invention are found in U.S. patent application Ser. No. 08/885,310 filed Jun. 30, 1997, now U.S. Pat. No. 6,023,753, U.S. patent application Ser. No. 08/949,122 filed Oct. 10, 1997, U.S. patent application Ser. No. 09/169,255 filed Oct. 9, 1998, U.S. patent application Ser. No. 09/169,256 filed Oct. 9, 1998, U.S. patent application Ser. No. 09/169,072 filed Oct. 9, 1998, U.S. patent application Ser. No. 09/187,539 filed Nov. 6, 1998, U.S. patent application Ser. No. 09/205,558 filed Dec. 4, 1998, U.S. patent application Ser. No. 09/215,081 filed Dec. 18, 1998, U.S. patent application Ser. No. 09/228,374 filed Jan. 12, 1999 and entitled "Methods and Apparatus to Dynamically Reconfigure the Instruction Pipeline of an Indirect Very Long Instruction Word Scalable Processor", U.S. patent application Ser. No. 09/238,446 filed Jan. 28, 1999, U.S. patent application Ser. No. 09/267,570 filed Mar. 12, 1999, U.S. patent application Ser. No. 09/337,839 filed Jun. 22, 1999, U.S. patent application Ser. No. 09/350,191 filed Jul. 9, 1999, U.S. patent application Ser. No. 09/422,015 filed Oct. 21, 1999 entitled "Methods and Apparatus for Abbreviated Instruction and Configurable Processor Architecture", U.S. patent application Ser. No. 09/432,705 filed Nov. 2, 1999 entitled "Methods and Apparatus for Improved Motion Estimation for Video Encoding", U.S. patent application Ser. No. 09/471,217 filed Dec. 23, 1999 entitled "Methods and Apparatus for Providing Data Transfer Control", U.S. patent application Ser. No. 09/472,372 filed Dec. 23, 1999 entitled "Methods and Apparatus for Providing Direct Memory Access Control", U.S. patent application Ser. No. 09/596,103 entitled "Methods and Apparatus for Data Dependent Address Operations and Efficient Variable Length Code Decoding in a VLIW Processor" filed Jun. 16, 2000, U.S. patent application Ser. No. 09/598,566 entitled "Methods and Apparatus for Generalized Event Detection and Action specification in a Processor" filed Jun. 21, 2000, U.S. patent application Ser. No. 09/598,567 entitled "Methods and Apparatus for Improved Efficiency in Pipeline Simulation and Emulation" filed Jun. 21, 2000, U.S. patent application Ser. No. 09/598,564 entitled "Methods and Apparatus for Initiating and Resynchronizing Multi-Cycle SIMD Instructions" filed Jun. 21, 2000, U.S. patent application Ser. No. 09/598,558 entitled "Methods and Apparatus for Providing Manifold Array (ManArray) Program Context Switch with Array Reconfiguration Control" filed Jun. 21, 2000, and U.S. patent application Ser. No. 09/598,084 entitled "Methods and Apparatus for Establishing Port Priority Functions in a VLIW Processor" filed Jun. 21, 2000, as well as, Provisional Application Ser. No. 60/113,637 entitled "Methods and Apparatus for Providing Direct Memory Access (DMA) Engine" filed Dec. 23, 1998, Provisional Application Ser. No. 60/113,555 entitled "Methods and Apparatus Providing Transfer Control" filed Dec. 23, 1998, Provisional Application Ser. No. 60/139,946 entitled "Methods and Apparatus for Data Dependent Address Operations and Efficient Variable Length Code Decoding in a VLIW Processor" filed Jun. 18, 1999, Provisional Application Ser. No. 60/140,245 entitled "Methods and Apparatus for Generalized Event Detection and Action Specification in a Processor" filed Jun. 21, 1999, Provisional Application Ser. No. 60/140,163 entitled "Methods and Apparatus for Improved Efficiency in Pipeline Simulation and Emulation" filed Jun. 21, 1999, Provisional Application Ser. No. 60/140,162 entitled "Methods and Apparatus for Initiating and Re-Synchronizing Multi-Cycle SIMD Instructions" filed Jun. 21, 1999, Provisional Application Ser. No. 60/140,244 entitled "Methods and Apparatus for Providing One-By-One Manifold Array (1×1 ManArray) Program Context Control" tiled Jun. 21, 1999, Provisional Application Ser. No. 60/140,325 entitled "Methods and Apparatus for Establishing Port Priority Function in a VLIW Processor" filed Jun. 21, 1999, Provisional Application Ser. No. 60/140, 425 entitled "Methods and Apparatus for Parallel Processing Utilizing a Manifold Array (ManArray) Architecture and Instruction Syntax" filed Jun. 22, 1999, Provisional Application Ser. No. 60/165,337 entitled "Efficient Cosine Transform Implementations on the ManArray Architecture" filed Nov. 12, 1999, and Provisional Application Ser. No. 60/171,911 entitled "Methods and Apparatus for DMA Loading of Very Long Instruction Word Memory" filed Dec. 23, 1999, Provisional Application Ser. No. 60/184,668 entitled "Methods and Apparatus for Providing Bit-Reversal and Multicast Functions Utilizing DMA Controller" filed Feb. 24, 2000, Provisional Application Ser. No. 60/184,529 entitled "Methods and Apparatus for Scalable Array Processor Interrupt Detection and Response" filed Feb. 24, 2000, Provisional Application Ser. No. 60/184,560 entitled "Methods and Apparatus for Flexible Strength Coprocessing Interface" filed Feb. 24, 2000, Provisional Application Ser. No. 60/203, 629 entitled "Methods and Apparatus for Power Control in a Scalable Array of Processor Elements" filed May 12, 2000, and Provisional Application Ser. No. 60/212,987 entitled "Methods and Apparatus for Indirect VLIW Memory Allocation" filed Jun. 21, 2000, respectively, all of which are assigned to the assignee of the present invention and incorporated by reference herein in their entirety.

All of the above noted patents and applications, as well as any noted below, are assigned to the assignee of the present invention and incorporated herein in their entirety.

In a presently preferred embodiment of the present invention, a ManArray 2×2 iVLIW single instruction multiple data stream (SIMD) processor 100 shown in FIG. 1 contains a controller sequence processor (SP) combined with processing element-0 (PE0) SP/PE0 101, as described in further detail in U.S. application Ser. No. 09/169,072 entitled "Methods and Apparatus for Dynamically Merging an Array Controller with an Array Processing Element". Three additional PEs 151, 153, and 155 are also utilized to demonstrate improved parallel array processing with a simple programming model in accordance with the present invention. It is noted that the PEs can be also labeled with their matrix positions as shown in parentheses for PE0 (PE00) 101, PE1 (PE01) 151, PE2 (PE10) 153, and PE3 (PE11) 155. The SP/PE0 101 contains a fetch controller 103 to allow the fetching of short instruction words (SIWs) from a B=32-bit instruction memory 105. The fetch controller 103 provides the typical functions needed in a programmable processor such as a program counter (PC), branch capability, digital signal processing eventpoint loop operations, support for interrupts, and also provides the instruction memory management control which could include an instruction cache if needed by an application. In addition, the SIW I-Fetch controller 103 dispatches 32-bit SIWs to the other PEs in the system by means of a 32-bit instruction bus 102.

In this exemplary system, common elements are used throughout to simplify the explanation, though actual implementations are not so limited. For example, the execution units 131 in the combined SP/PE0 101 can be separated into a set of execution units optimized for the control function, e.g. fixed point execution units, and the PE0 as well as the other PEs 151, 153 and 155 can be optimized for a floating point application. For the purposes of this description, it is assumed that the execution units 131 are of the same type in the SP/PE0 and the other PEs. In a similar manner, SP/PE0 and the other PEs use a five instruction slot iVLIW architecture which contains a very long instruction word memory (VIM) memory 109 and an instruction decode and VIM controller function unit 107 which receives instructions as dispatched from the SP/PE0's I-Fetch unit 103 and generates the VIM addresses-and-control signals 108 required to access the iVLIWs stored in the VIM. These iVLIWs are identified by the letters SLAMD in VIM 109. The loading of the iVLIWs is described in further detail in U.S. patent application Ser. No. 09/187,539 entitled "Methods and Apparatus for Efficient Synchronous MIMD Operations with iVLIW PE-to-PE Communication". Also contained in the SP/PE0 and the other PEs is a common PE configurable register tile 127 which is described in further detail in U.S. patent application Ser. No. 09/169,255 entitled "Methods and Apparatus for Dynamic Instruction Controlled Reconfiguration Register File with Extended Precision".

Due to the combined nature of the SP/PE0, the data memory interface controller 125 must handle the data processing needs of both the SP controller, with SP data in memory 121, and PE0, with PE0 data in memory 123. The SP/PE0 controller 125 also is the source of the data that is sent over the 32-bit broadcast data bus 126. The other PEs 151, 153, and 155 contain common physical data memory units 123', 123", and 123''' though the data stored in them is generally different as required by the local processing done on each PE. The interface to these PE data memories is also a common design in PEs 1, 2, and 3 and indicated by PE local memory and data bus interface logic 157, 157' and 157". Interconnecting the PEs for data transfer communications is the cluster switch 171 more completely described in U.S. Pat. No. 6,023,753 entitled "Manifold Array Processor", U.S. application Ser. No. 09/949,122 entitled "Methods and Apparatus for Manifold Array Processing", and U.S. application Ser. No. 09/169,256 entitled "Methods and Apparatus for ManArray PE-to-PE Switch Control". The interface to a host processor, other peripheral devices, and/or external memory can be done in many ways. The primary mechanism shown for completeness is contained in a direct memory access (DMA) control unit 181 that provides a scalable ManArray data bus 183 that connects to devices and interface units external to the ManArray core. The DMA control unit 181 provides the data flow and bus arbitration mechanisms needed for these external devices to interface to the ManArray core memories via the multiplexed bus interface represented by line 185. A high level view of a ManArray Control Bus (MCB) 191 is also shown.

Turning now to specific details of the ManArray architecture and instruction syntax as adapted by the present invention, this approach advantageously provides a variety of benefits. Among the benefits of the ManArray instruction syntax, as further described herein, is that first the instruction syntax is regular. Every instruction can be deciphered in up to four parts delimited by periods. The four parts are always in the same order which lends itself to easy parsing for automated tools. An example for a conditional execution (CE) instruction is shown below:

(CE).(NAME).(PROCESSOR/UNIT).(DATATYPE)

Below is a brief summary of the four parts of a ManArray instruction as described herein:

(1) Every instruction has an instruction name.
(2A) Instructions that support conditional execution forms may have a leading (T. or F.) or . . .
(2B) Arithmetic instructions may set a conditional execution state based on one of four flags (C=carry, N=sign, V=overflow, Z=zero).
(3A) Instructions that can be executed on both an SP and a PE or PEs specify the target processor via (.S or .P) designations. Instructions without an .S or .P designation are SP control instructions.
(3B) Arithmetic instructions always specify which unit or units that they execute on (A=ALU, M=MAU, D=DSU).
(3C) Load/Store instructions do not specify which unit (all load instructions begin with the letter 'L' and all stores with letter 'S'.
(4A) Arithmetic instructions (ALU, MAU, DSU) have data types to specify the number of parallel operations that the instruction performs (e.g., 1, 2, 4 or 8), the size of the data type (D=64 bit doubleword, W=32 bit word, H=16 bit halfword, B=8 bit byte, or FW=32 bit floating point) and optionally the sign of the operands (S=Signed, U=Unsigned).
(4B) Load/Store instructions have single data types (D=doubleword, W=word, H1=high halfword, H0=low halfword, B0=byte0).

The above parts are illustrated for an exemplary instruction below:

The 196 variations come from (CE)*(PROCS)*(UNITS)*(DATATYPES)=7*2*2*7=196. It is noted that the 'e' in the CE entry below is for unconditional execution.

| | |
|---|---|
| set instruction(ADD,CE) | {e t. f. c n v z} |
| set instruction(ADD,PROCS) | {s p} |
| set instruction(ADD,UNITS) | {a m} |
| set instruction(ADD,DATATYPES) | {1d 1w 2w 2h 4h 4b 8b} |
| set instruction(ADD,FORMAT,1d) | {RTE RXE RYE} |
| set instruction(ADD,FORMAT,1w) | {RT RX RY} |
| set instruction(ADD,FORMAT,2w) | {RTE RXE RYE} |
| set instruction(ADD,FORMAT,2h) | {RT RX RY} |
| set instruction(ADD,FORMAT,4h) | {RTE RXE RYE} |
| set instruction(ADD,FORMAT,4b) | {RT RX RY} |
| set instruction(ADD,FORMAT,8b) | {RTE RXE RYE} |

The example above only demonstrates the instruction syntax. Other entries in each instruction record include the number of cycles the instruction takes to execute (CYCLES), encoding tables for each field in the instruction (ENCODING) and configuration information (CONFIG) for subsetting the instruction set. Configuration information (1×1, 1×2, etc.) can be expressed with evaluations in the database entries:

```
proc Manta { } {
# are we generating for Manta?
```

```
[TF.]instr[CNVZ] . [SP] [AMD] . [1248] [SU] [DWHBF]
 |   |   |   |    |  [DWH1H0B]    |
 |   |   |   |    |     |         |
 |   |   |   |    |     |  +-- (4A) Arithmetic Data Type 1SD, 1UD, 1D,
1SW, 1UW, 1W, 2SW, 2UW, 2W,...)
 |   |   |   |    |     |
 |   |   |   |    |     +-- (4B) Load/Store Data Type (D, W, H1, H0, B)
 |   |   |   |    |
 |   |   |   |    +-- (3B) Arithmetic Unit (ALU, MAU, DSU)
 |   |   |   |        (3C) Load/Store Instructions do not specify which unit
 |   |   |   |
 |   |   |   +-- (3A) Target processor (.S for SP, .P for PE)
 |   |   |
 |   |   +-- (2B) Set conditional execution state based on flag (C N V Z)
 |   |
 |   +-- (1) Instruction name (ADD, SUB, etc...)
 |
 +-- (2A) Conditional execution (Execute if true T. or execute if false F.)
```

Second, because the instruction set syntax is regular, it is relatively easy to construct a database for the instruction set. The database is organized as instructions with each instruction record containing entries for conditional execution (CE), target processor (PROCS), unit (UNITS), datatypes (DATATYPES) and operands needed for each datatype (FORMAT). The example below using TcLsyntax, as further described in J. (justerhout, *Tcl and the Tk Toolkit*, Addison-Wesley, ISBN 0-201-63337-X, 1994, compactly represents all 196 variations of the ADD instruction.

-continued

```
    return 1
# are we generating for ManArray?
# return 0
}
set instruction(MPY,CE)[Manta]?{e t. f.}:{e t. f. c n v z}
```

Having the instruction set defined with a regular syntax and represented in database form allows developers to create tools using the instruction database. Examples of tools that have been based on this layout are:

Assembler (drives off of instruction set syntax in database),
Disassembler (table lookup of encoding in database),
Simulator (used database to generate master decode table for each possible form of instruction), and
Testcase Generators (used database to generate testcases for assembler and simulator).

Another aspect of the present invention is that the syntax of the instructions allows for the ready generation of self-checking code from test vectors parameterized over conditional execution/datatypes/sign-extension/etc. TCgen, a test case generator, and LSgen are exemplary programs that generate self-checking assembly programs that can be run through a Verilog simulator and C-simulator.

An outline of a TCgen program 200 in accordance with the present invention is shown in FIG. 2. Such programs can be used to test all instructions except for flow-control and iVLIW instructions. TCgen uses two data structures to accomplish this result. The first data structure defines instruction-set syntax (for which datatypes/ce[1,2,3]/sign extension/rounding/operands is the instruction defined) and semantics (how many cyles/does the instruction require to be executed, which operands are immediate operands, etc.). This data structure is called the instruction-description data structure.

An instruction-description data structure 300 for the multiply instruction (MPY) is shown in FIG. 3 which illustrates an actual entry out of the instruction-description for the multiply instruction (MPY) in which e stands for empty. The second data structure defines input and output state for each instruction. An actual entry out of the MAU-answer set for the MPY instruction 400 is shown in FIG. 4. State can contain functions which are context sensitive upon evaluation. For instance, when defining an MPY test vector, one can define: $RX_b$ (RX before)=maxint, $RY_b$ (RY before)=maxint, $RT_a$=maxint*maxint. When TCgen is generating an unsigned word form of the MPY instruction, the maxint would evaluate to 0xffffffff. When generating an unsigned halfword form, however, it would evaluate to 0xffff. This way the test vectors are parameterized over all possible instruction variations. Multiple test vectors are used to set up and check state for packed data type instructions.

The code examples of FIGS. 3 and 4 are in Tel syntax, but are fairly easy to read. "Set" is an assignment, ( ) are used for array indices and the { } are used for defining lists. The only functions used in FIG. 4 are "maxint", "minint", "sign0unsi1", "sign1unsi0", and an arbitrary arithmetic expression evaluator (mpexpr). Many more such functions are described herein below.

TCgen generates about 80 tests for these 4 entries, which is equivalent to about 3000 lines of assembly code. It would take a long time to generate such code by hand. Also, parameterized testcase generation greatly simplifies maintenance. Instead of having to maintain 3000 lines of assembly code, one only needs to maintain the above defined vectors. If an instruction description changes, that change can be easily made in the instruction-description file. A configuration dependent instruction-set definition can be readily established. For instance, only having word instructions for the ManArray, or fixed point on an SP only, can be fairly easily specified.

Test generation over database entries can also be easily subset. Specifying "SUBSET(DATATYPES) {1sw 1sh}" would only generate testcases with one signed word and one signed halfword instruction forms. For the multiply instruction (MPY), this means that the unsigned word and unsigned halfword forms are not generated. The testcase generators TelRita and TelRitaCorita are tools that generate streams of random (albeit with certain patterns and biases) instructions. These instruction streams are used for verification purposes in a co-verification environment where state between a C-simulator and a Verilog simulator is compared on a per-cycle basis.

Utilizing the present invention, it is also relatively easy to map the parameterization over the test vectors to the instruction set since the instruction set is very consistent.

Further aspects of the present invention are addressed in the Manta User and Reference Information found in U.S. Pat. Nos. 6,748,517 and 7,266,620 at cols. 9-1050. That documentation is divided into the following principle sections:
Section I—Table of Contents;
Section II—Programmer's User's Guide (PUG);
Section III—Programmer's Reference (PREF).

The Programmer's User's Guide Section addresses the following major categories of material and provides extensive details thereon: (1) an architectural overview; (2) processor registers; (3) data types and alignment; (4) addressing modes; (5) scalable conditional execution (CE); (6) processing element (PE) masking; (7) indirect very long instruction words (iVLIWs); (8) looping; (9) data communication instructions; (10) instruction pipeline; and (11) extended precision accumulation operations.

The Programmer's Reference Section addresses the following major categories of material and provides extensive details thereof (1) floating-point (FP) operations, saturation and overflow; (2) saturated arithmetic; (3) complex multiplication and rounding; (4) key to instruction set; (5) instruction set; (6) instruction formats, as well as, instruction field definitions.

While the present invention has been disclosed in the context of various aspects of presently preferred embodiments, it will be recognized that the invention may be suitably applied to other environments and applications consistent with the claims which follow.

We claim:

1. A method comprising:
loading a block of instructions in a first memory, wherein the block of instructions comprises a load very long instruction word (LV) instruction followed by N simplex instructions;
receiving the LV instruction from the first memory in a processor, wherein the processor is configured with a count value of N and address information to identify a location in a very long instruction word (VLIW) memory (VIM) in response to the LV instruction fetched from the first memory; and
loading each of the N simplex instructions in a simplex instruction slot at the location in the VIM to create a VLIW comprising the N simplex instructions.

2. The method of claim 1 further comprising:
loading a VIM base address value in the processor prior to receiving the LV instruction; and
generating a VIM address to identify the location in the VIM as a function of the VIM base address value and the address information in response to the received LV instruction.

3. The method of claim 2 further comprising:
selecting a VIM base address register from a group of VIM base address registers in response to the LV instruction, wherein the selected VIM base address register stores the VIM base address value.

4. The method of claim 1 further comprising:
receiving the LV instruction fetched from the first memory in a masked processor, wherein a VIM associated with the masked processor is unaffected.

5. The method of claim 1, wherein the processor is an array of processing elements (PEs) and the LV instruction and N simplex instructions are received in unmasked PEs to create VLIWs in each VIM associated with each unmasked PE.

6. The method of claim 1 further comprising:
loading with each simplex instruction an associated disable bit in the simplex instruction slot, wherein the LV instruction includes a disable bit for each simplex instruction slot;
selecting the VLIW in response to a first execute VLIW (XV) instruction fetched from the first memory, wherein the first XV instruction includes an enable bit for each simplex instruction slot; and
executing each simplex instruction from the VLIW having a corresponding enable bit from the first XV instruction and a corresponding disable bit from a simplex instruction slot both set to an enable state.

7. The method of claim 6 further comprising:
selecting the VLIW in response to a second XV instruction fetched from the first memory, wherein the second XV instruction includes an enable bit for each simplex instruction slot, wherein the enable bits of the second XV instruction are different than the enable bits of the first XV instruction; and
executing each simplex instruction from the VLIW having a corresponding enable bit from the second XV instruction and a corresponding disable bit from a simplex instruction slot both set to an enable state, wherein a first set of simplex instructions executed from the VLIW in response to the first XV instruction is different than a second set of simplex instructions executed from the VLIW in response to the second XV instruction.

8. The method of claim 6 further comprising:
changing a state of a disable bit in one of the simplex instruction slots;
selecting the VLIW in response to a second XV instruction fetched from the first memory, wherein the second XV instruction includes an enable bit for each simplex instruction slot, wherein the enable bits of the second XV instruction are the same as the enable bits of the first XV instruction; and
executing each simplex instruction from the VLIW having a corresponding enable bit from the second XV instruction and a corresponding disable bit from a simplex instruction slot both set to an enable state, wherein a first set of simplex instructions executed from the VLIW in response to the first XV instruction is different than a second set of simplex instructions executed from the VLIW in response to the second XV instruction.

9. The method of claim 6 further comprising:
changing in a second VIM associated with a second processor a state of a disable bit in one of the simplex instruction slots of a second VLIW, wherein the second VLIW comprises the N simplex instructions and is located at the location of the VLIW in the VIM;
selecting the second VLIW from the second VIM and the VLIW from the VIM in response to a second XV instruction fetched from the first memory, wherein the second XV instruction includes an enable bit for each simplex slot instruction set to an enable state; and
executing each simplex instruction from the VLIW and from the second VLIW having a corresponding enable bit from the second XV instruction and a corresponding disable bit from a simplex instruction slot both set to an enable state, wherein a first set of simplex instructions executed from the VLIW is different than a second set of simplex instructions executed from the second VLIW.

10. The method of claim 1 further comprising:
loading with the VLIW a unit affecting field (UAF) included in the received LV instruction, wherein the UAF enables an instruction slot to set condition flags at the time the VLIW is executed;
selecting the VLIW in response to a first execute VLIW (XV) instruction fetched from the first memory, wherein the first XV instruction includes an XV UAF for the VLIW and an indication to override the UAF loaded by the received LV instruction; and
executing the VLIW with the XV UAF specified instruction slot enabled to set condition flags in response to the execution of the VLIW.

11. The method of claim 1 further comprising:
loading with the VLIW a unit affecting field (UAF) included in the received LV instruction, wherein the UAF enables an instruction slot to set condition flags at the time the VLIW is executed;
selecting the VLIW in response to a first execute VLIW (XV) instruction fetched from the first memory, wherein the first XV instruction includes an indication to maintain the UAF loaded by the received LV instruction; and
executing the VLIW with the UAF specified instruction slot enabled to set condition flags in response to the execution of the VLIW.

12. A method comprising:
loading a block of instructions in a first memory, wherein the block of instructions comprises a first load very long instruction word (LV) instruction followed by N simplex instructions;
receiving the first LV instruction fetched from the first memory in an unmasked first processor, wherein the unmasked first processor is configured with a count value of N and a first address in a first very long instruction word (VLIW) memory (VIM) in response to the received first LV instruction;
receiving the first LV instruction in a masked second processor, wherein a configuration of the masked second processor is unaffected; and
loading each of the N simplex instructions fetched from the first memory in a simplex instruction slot at the first address in the first VIM to create a first VLIW having the N simplex instructions.

13. The method of claim 12 further comprising:
configuring the first processor to be masked and the second processor to be unmasked;
loading a second block of instructions in the first memory, wherein the second block of instructions comprises a second LV instruction followed by M simplex instructions;
receiving the second LV instruction fetched from the first memory in the unmasked second processor with a count value of M and the first address in a second VIM in response to the received second LV instruction;
receiving the second LV instruction in the masked first processor, wherein a configuration of the masked first processor is unaffected; and
loading each of the M simplex instructions fetched from the first memory in a simplex instruction slot at the first address in the second VIM to create a second VLIW having the M simplex instructions.

14. The method of claim 13 further comprising:
configuring the first processor and the second processor to be unmasked; and
selecting the first VLIW from the first VIM and the second VLIW from the second VIM in response to a first execute VLIW (XV) instruction fetched from the first memory.

15. The method of claim 12 further comprising:
loading a first VIM base address value in a first VIM base register in the unmasked first processor prior to receiving the first LV instruction; and
generating the first address as a function of the first VIM base address value and address information contained in the received first LV instruction.

16. The method of claim 12 further comprising:
configuring the first processor to be masked and the second processor to be unmasked;
loading a second block of instructions in the first memory, wherein the second block of instructions comprises a second LV instruction followed by M simplex instructions;
receiving the second LV instruction fetched from the first memory in the unmasked second processor, wherein the unmasked second processor is configured with a count value of M and a second address in a second VIM in response to the received second LV instruction;
receiving the second LV instruction in the masked first processor, wherein a configuration of the masked first processor is unaffected; and
loading each of the M simplex instructions fetched from the first memory in a simplex instruction slot at the second address in the second VIM to create a second VLIW having the M simplex instructions.

17. The method of claim 16 further comprising:
configuring the first processor and the second processor to be unmasked; and
selecting the first VLIW at the first address from the first VIM and the second VLIW at the second address from the second VIM in response to a first execute VLIW (XV) instruction fetched from the first memory.

18. A program memory for storing non-transitory processor instructions, the program memory comprising:
program steps for loading a block of instructions in a first memory, wherein the block of instructions comprises a load very long instruction word (LV) instruction followed by N simplex instructions;
program steps for receiving the LV instruction from the first memory in a processor, wherein the processor is configured with a count value of N and address information to identify a location in a very long instruction word (VLIW) memory (VIM) in response to the LV instruction fetched from the first memory; and
program steps for loading each of the N simplex instructions fetched from the first memory in a simplex instruction slot at the location in the VIM to create a VLIW having the N simplex instructions.

19. The program memory of claim 18 further comprising:
program steps for loading a VIM base address value in the processor prior to receiving the LV instruction; and
program steps for generating a VIM address to identify the location in the VIM as a function of the VIM base address value and the address information in response to the received LV instruction.

20. The program memory of claim 18 wherein the processor is an array of processing elements (PEs) and the LV instruction and the N simplex instructions are received in unmasked PEs to create the VLIW in each VIM associated with each unmasked PE.

* * * * *